(12) United States Patent
Evers-Senne et al.

(10) Patent No.: US 10,157,474 B2
(45) Date of Patent: Dec. 18, 2018

(54) 3D RECORDING DEVICE, METHOD FOR PRODUCING A 3D IMAGE, AND METHOD FOR SETTING UP A 3D RECORDING DEVICE

(71) Applicant: Testo AG, Lenzkirch (DE)

(72) Inventors: Jan-Friso Evers-Senne, Lenzkirch (DE); Martin Stratmann, Freiburg i. Br. (DE); Patrick Zahn, Titisee-Neustadt (DE)

(73) Assignee: Testo AG, Lenzkirch (DE)

( * ) Notice: Subject to any disclaimer, the term of this patent is extended or adjusted under 35 U.S.C. 154(b) by 263 days.

(21) Appl. No.: 14/896,154

(22) PCT Filed: Jun. 2, 2014

(86) PCT No.: PCT/EP2014/001474
§ 371 (c)(1),
(2) Date: Feb. 26, 2016

(87) PCT Pub. No.: WO2014/195000
PCT Pub. Date: Dec. 11, 2014

(65) Prior Publication Data
US 2016/0189362 A1 Jun. 30, 2016

(30) Foreign Application Priority Data
Jun. 4, 2013 (DE) .................. 10 2013 009 288

(51) Int. Cl.
*G06T 7/70* (2017.01)
*H04N 13/189* (2018.01)
(Continued)

(52) U.S. Cl.
CPC ............... *G06T 7/70* (2017.01); *G06T 7/579* (2017.01); *H04N 13/189* (2018.05); *H04N 13/204* (2018.05)

(58) Field of Classification Search
None
See application file for complete search history.

(56) References Cited

U.S. PATENT DOCUMENTS 8,218,131 B2 7/2012 Otani et al.
8,837,779 B2 9/2014 Meier
(Continued)

FOREIGN PATENT DOCUMENTS

| DE | 102007055262 | 5/2009 |
|---|---|---|
| DE | 102009049849 | 4/2011 |
| DE | 102010042649 | 4/2012 |
| JP | 2008076303 | 4/2008 |

OTHER PUBLICATIONS

Hassan, Taher, et al. "Photogrammetric bridging of GPS/INS in urban centers for mobile mapping applications." Proceedings of the Institute of Navigation—19th International Technical Meeting of the Satellite Division, ION GNSS. 2006. 7 pages.*
(Continued)

*Primary Examiner* — Ryan P Potts
(74) *Attorney, Agent, or Firm* — Volpe and Koenig, P.C.

(57) ABSTRACT

A 3D recording device (1) is provided including an image recording device (2), a distance measuring device (3), and an output unit (5). An image processing device (4) is used to calculate, for a sequence (8) of images (9, 10) recorded in different poses (15, 16, 17), groups (29, 30, 31, 32) of image elements (18, 19, 20, 21, 25, 26, 27, 28) corresponding to each other and to determine for each group (29, 30, 31, 32) a three-dimensional position indication (48, 49, 50) and to scale the three-dimensional position indication (48, 49, 50) with the aid of distance information (42) measured by the distance measuring device (3).

30 Claims, 5 Drawing Sheets

(51) Int. Cl.
  *H04N 13/204* (2018.01)
  *G06T 7/579* (2017.01)

(56) References Cited

U.S. PATENT DOCUMENTS

| | | | | |
|---|---|---|---|---|
| 2003/0031360 | A1* | 2/2003 | Logan | G01S 17/89 382/154 |
| 2003/0202089 | A1* | 10/2003 | Alhadef | G01C 11/06 348/42 |
| 2004/0105573 | A1* | 6/2004 | Neumann | G06T 17/00 382/103 |
| 2008/0246759 | A1* | 10/2008 | Summers | G06F 3/0304 345/420 |
| 2009/0268214 | A1* | 10/2009 | Lucic | G01B 11/25 356/614 |
| 2010/0117812 | A1* | 5/2010 | Laubinger | B60R 1/00 340/435 |
| 2013/0182906 | A1* | 7/2013 | Kojo | G01S 11/12 382/103 |

OTHER PUBLICATIONS

Dai, Fei, and Ming Lu. "Assessing the accuracy of applying photogrammetry to take geometric measurements on building products." Journal of construction engineering and management 136.2 (2010): 242-250. 9 pages.*

Westoby, M. J., et al. "'Structure-from-Motion' photogrammetry: A low-cost, effective tool for geoscience applications." Geomorphology 179 (2012): 300-314. 15 pages.*

Klein, Laura, Nan Li, and Burcin Becerik-Gerber. "Imaged-based verification of as-built documentation of operational buildings." Automation in Construction 21 (2012): 161-171. 12 pages.*

Kolev, K. et al. "Fast Joint Estimation of Silhouettes and Dense 3D Geometry from Multiple Images", IEEE Transactions on Pattern Analysis an Machine Intelligence, 34(3), pp. 493-505, 2012.

Fa. Bosch Presse-Information, Der neue Laser-Entgfernungsmesser DLE 70 Professional von Bosch, Aug. 2008.

Martinez, et al., "Non-Contact 3D Measurement of Buildings through Close Range Photogrammetry and a Laser Distance Meter", Photogrammetric Enginnering and Remote Sensing, American Society for Photogrammetry and Remote Sensing, US., vol. 77, No. 8, Aug. 1, 2011, pp. 805-811.

Ordonez, C. et al., "Measuring building facades with a low-cost close-range photogrammetry system", Automation in Construction, Elsevier Science Publishers, Amsterdam, NL, vol. 19, No. 6, Oct. 1, 2010, pp. 742-749.

Zakaria, A.M., et al., "3D Reconstruction of a scene from multiple uncalibrated images using close range photogrammetry", in: Proc 2010 International Symposium in Information Technology (ITSim), vol. 1, 2010, pp. 1-5.

* cited by examiner

3D RECORDING DEVICE, METHOD FOR PRODUCING A 3D IMAGE, AND METHOD FOR SETTING UP A 3D RECORDING DEVICE

BACKGROUND

The invention relates to a 3D recording device comprising an image-recording device, a rangefinder and an image-processing device.

The invention furthermore relates to a method for producing a 3D image.

The invention finally relates to a method for setting up a 3D recording device.

The practice of producing 3D images of objects by means of pattern projection or scanning is known. The 3D recording devices suitable to this end are complicated and require a well-trained user.

SUMMARY

The invention has tasked itself to provide a simplified method for producing an approximately 3D image.

In order to achieve this object, one or more features are provided according to the invention. In particular, what is therefore provided according to the invention in a 3D recording device of the type set forth at the outset is: that the image-processing device is configured to identify at least one group of mutually corresponding image constituents in a sequence of at least two images recorded by the image-recording device, that the image-processing device is configured to calculate at least one three-dimensional position specification in relation to the at least one group of mutually corresponding image constituents from a respective image position of the image constituents from the group in the images of the sequence, and that the image-recording device is configured to scale the calculated at least one three-dimensional position specification by means of distance information measured by the rangefinder. What is advantageous in this case is that the construction of a 3D image is made possible from a sequence of recorded images, e.g. frames in a video sequence, on the basis of the image positions of identified image constituents in the images which correspond to one another. From this, three-dimensional position specifications of the identified image constituents are calculable, which position specifications are scalable to the actual dimensions with one item of distance information or a few items of distance information. Thus, actual lengths, areas and/or volumes are obtainable. What is advantageous here is that only a little distance information needs to be measured, e.g. a single item of distance information or less than ten items of distance information or a number of items of distance information that is less than half the number of identified groups of mutually corresponding image constituents. This significantly simplifies the requirements on the utilizable rangefinder, as a result of which the operation becomes simpler.

Therefore, corresponding image constituents denote image constituents in the images which correspond to one another in terms of content due to corresponding or similar features, or in any other way.

The rangefinder is preferably configured to measure a distance along a measurement direction extending e.g. in a line-shaped or beam-shaped manner. By way of example, the measurement direction can be specified by a measurement beam generated by the rangefinder.

The rangefinder can therefore be configured for a punctiform distance measurement.

The rangefinder can be based on different measurement principles. By way of example, a laser distance measurement is possible if the rangefinder is embodied as a laser rangefinder. Here, the rangefinder can generate a laser measurement beam as measurement beam, by means of which a distance is measurable. It is also possible to carry out ultrasonic measurements of the distance information.

Provision can be made for an output unit to be embodied to output the at least one scaled three-dimensional position specification. Hence, scaling information about a produced 3D image is providable and/or processable.

In one embodiment of the invention, provision can be made for the image-processing to be configured to calculate a recording pose of the image-recording device from the respective image positions of the image constituents of the at least one of group. What is advantageous in this case is that conclusions about the recording conditions can be obtained. What is furthermore advantageous in this case is that measured distance information can be related to a recording location.

In one embodiment of the invention, provision can be made for the image-processing device to be configured to calculate further three-dimensional position specifications from the calculated three-dimensional position specification and recorded poses. What is advantageous in this case is that additional interpolation nodes for a refined 3D image are establishable. By way of example, the image-processing device can be configured to calculate by way of a stereo method and/or from an interface calculated by a level set method.

Therefore, the identification of groups of corresponding image constituents can be brought about by virtue of an image constituent initially being identified in an image and image constituents corresponding the identified image constituent in terms of content being sought after in further images.

Preferably, a plurality of groups, for example more than 10 or more than 50 or even more than 100 groups, of corresponding image constituents are identified. It is possible to set up a system of equations from the image positions of the image constituents of these groups in the respective individual images, which system of equations describes the individual images as projections of a three-dimensional arrangement of the image constituents in space. This three-dimensional arrangement constitutes a usable approximation of the recorded scene. Here, the image-processing device can be configured to solve this system of equations in order to calculate a three-dimensional position specification for each group of image constituents.

It is particularly expedient if the 3D recording device is a photo camera, a camera or a cellular telephone equipped with a photo functionality, a tablet PC or the like, which is equipped in each case with a preferably detachable rangefinder. The 3D recording device can also be embodied as a thermal imaging camera.

Since the invention makes do with a small number of distance information measurements, e.g. a single measurement of distance information, it is possible to use rangefinders which only meet few requirements.

It is even possible to equip an available image-recording device, e.g. a camera or a photography cellular phone, a smartphone, a tablet PC or a thermal imaging camera, with a rangefinder which, for example, can be clipped on or plugged on or attached in any other way, preferably in a detachable manner, in order to provide a 3D recording device by means of which—after setting up the operating software in an appropriate manner—the method according to the invention can be carried out.

In one embodiment of the invention, provision can be made for the image-processing device to be configured to identify the at least one group of mutually corresponding image constituents by means of a feature analysis. What is advantageous in this case is that characteristic image constituents are identifiable, in relation to which image constituents are identifiable in the remaining images of the sequence with a high probability, which image constituents correspond to one another in terms of content.

In one embodiment of the invention, provision can be made for the image-processing device to be configured to segment the images into image segments. What is advantageous in this case is that individual image constituents are processable separately from one another.

In one embodiment of the invention, provision can be made for the image-processing device to be configured to calculate distance information associated with the at least one group of mutually corresponding image constituents in an extrapolation and/or interpolation method from the measured distance information and the three-dimensional position specification. What is advantageous in this case is that additional distance information which is assignable to the groups of image constituents is obtainable. Hence, the number of required measurements of distance information can be reduced further. Here, it is possible to use known extrapolation methods and/or interpolation methods.

Alternatively or additionally, provision can be made for the image-processing device to be configured to calculate further three-dimensional position specifications in an extrapolation and/or interpolation method. What is advantageous in this case is that additional interpolation nodes are calculable in order to generate a refined 3D image.

In one embodiment of the invention, provision can be made for the rangefinder to be configured to modify an alignment of a measurement direction and/or of a measurement beam. By way of example, provision in this respect can be made for the rangefinder to be arranged in a manner movable in different measurement directions. Alternatively or additionally, provision can be made for a beam path of a measurement beam to be modifiable, for example by switchable and/or movable mirrors or other optical elements. Hence, a measurement point for the distance measurement is changeable. What is advantageous in this case is that a plurality of distance measurements can be carried out by one rangefinder. What is furthermore advantageous is that it is possible to carry out more precise distance measurements for scene constituents that correspond to identified groups of image constituents. By way of example, the rangefinder can in this case be alignable onto scene constituents that correspond to an identified group of image constituents in each case. Hence, distance measurements can be carried out in relation to individual, or all, identified groups of image constituents.

In one embodiment of the invention, provision can be made for an actuation unit to be embodied to align the, or a, measurement direction of the rangefinder in such a way that the measured distance information is related to an image segment. What is advantageous is that targeted distance measurements can be carried out, which are respectively assignable to individual groups of image constituents. This can be achievable by aligning a measurement beam.

Here, a current recording pose can be calculable or estimateable by a temporal extrapolation of previously calculated recording poses and/or by evaluating an output signal of a movement and/or acceleration sensor. Using this new recording pose, it is possible to set an alignment of the measurement direction for obtaining distance information in a targeted manner, for example for an image constituent for which there are no, or hardly any, three-dimensional position specifications.

Embodiments with a particularly simple structure emerge if the rangefinder is arranged in a rigid manner at the image-recording device or in relation thereto. In order to change the alignment of the measurement beam, a mirror mechanism with movable and/or switchable mirrors can be formed.

In one embodiment of the invention, provision can be made for the distance instrument to be embodied to generate a measurement beam in a spectral range detectable by the image-recording device. What is advantageous in this case is that it is possible to carry out calibration measurements in which light patterns, which are generated by the rangefinder, are identifiable as corresponding image constituents of a group. What is advantageous in this case is that an alignment of the rangefinder in relation to a recording direction of the image-recording device is calculable from the image positions of these image constituents.

In one embodiment of the invention, provision can be made for a movement and/or acceleration sensor to be configured to detect a movement of the image-recording device. What is advantageous in this case is that the calculation of the three-dimensional position specifications can be supported by virtue of information about a change in the recorded scene due to a change in the recording pose of the image-recording device being implementable from an output signal of the movement and/or acceleration sensor. Hence, the required computational capacity in the image-processing device is once again reducible. What is furthermore advantageous is that, for future recordings of images, associated recording poses are estimateable or calculable from already calculated recording poses by temporal extrapolation and integration of the output signal.

In one embodiment of the invention, provision can be made for the image-processing device to be configured to eliminate outliers among the at least one three-dimensional position specification. What is advantageous here is that it is possible to select those position specifications from the set of calculated three-dimensional position specifications which can be assigned to measured or calculated items of distance information with a high probability. What is furthermore advantageous is that three-dimensional position specifications which are based on e.g. computational errors or identification errors, can be eliminated. Hence, the quality of the 3D image generation is improvable.

In one embodiment of the invention, provision can be made for the image-processing device to be configured to fit a geometric object into the at least one scaled three-dimensional position specification. The geometric object can be a one-, two- or three-dimensional sample body or a more complex object. By way of example, the image-processing device can be configured to fit a line, in particular a straight line, into a set of at least two three-dimensional position specifications. By way of example, the image-processing device can be configured to fit an area, in particular a plane, into a set of at least three three-dimensional position specifications. What is advantageous in this case is that graphical interpolations and/or additions of the 3D image can be carried out.

In one embodiment of the invention, provision can be made for the image-processing device to be configured to calculate at least one length, area and/or volume from the preferably scaled three-dimensional position specifications. Preferably, the path, the area and/or the space, for which the respective variable information is calculable, is described by the calculated three-dimensional position specifications. What is advantageous in this case is that real physical reference values, e.g. areas or volumes of emitting objects, are providable for further processing and/or evaluating measurement results.

In one embodiment of the invention, provision can be made for the output unit to be configured to graphically output the at least one group of mutually corresponding image constituents at an image point corresponding to the preferably scaled three-dimensional position specification. What is advantageous in this case is that further two-dimensional images, e.g. perspective images, of the calculated 3D image are providable.

In order to achieve the aforementioned object, according to the invention it is provided in a method for producing a 3D image: that a sequence of at least two images of a scene is recorded by means of an image-recording device and at least one group of mutually corresponding image constituents is identified in the recorded images, that at least one three-dimensional position specification relating to the at least one group of mutually corresponding image constituents is calculated in an image-processing device, that at least one item of distance information in relation to the scene is measured by a rangefinder and that scaling of the position specification is performed by means of the measured distance information. What is advantageous in this case is that a 3D image is producible with a number of distance measurements that is as small as possible. To this end, the image-processing device can be equipped and configured from a computational point of view in such a way that a system of equations which describes the image positions of the mutually corresponding image constituents from the at least one group in the individual images as point of incidence of projections is solved in order to calculate the at least one three-dimensional position specification. It is particularly expedient if a multiplicity of such groups are identified in order to reproduce an imaged scene as exactly as possible in three dimensions. The method according to the invention is distinguished by low requirements from a computational and measurement point of view. Preferably, the method according to the invention is carried out using a 3D recording device according to the invention.

In one embodiment of the invention, provision can be made for at least one recording pose of the image-recording device at a recording time to be calculated from the respective image position of the image constituents from the at least one group in the images of the sequence. What is advantageous in this case is that a recording situation can easily be reproduced from a calculation point of view. To this end, it is again possible to set up, and solve, a system of equations. Preferably, this system of equations is the same as in the calculation of the three-dimensional position specifications from the image positions of the image constituents. What is advantageous in this case is that a beam profile during the imaging process is calculable using the recording poses.

In one embodiment of the invention, provision can be made for further three-dimensional position specifications in relation to further image constituents to be calculated before or after the scaling. What is advantageous in this case is that a resolution of a produced 3D image can be refined.

In one embodiment of the invention, provision can be made for the further three-dimensional position specifications to be calculated in a stereo method. The stereo method is known per se, for example from DE 10 2007 055 262 A1. By way of example, it can be characterized by corresponding image constituents initially being identified in at least two images and by imaging rays subsequently being established in a three-dimensional space using a recording pose calculated for the images, with the (approximate) crossing point of said rays resulting in a further three-dimensional position specification.

In one embodiment of the invention, provision can be made for the further three-dimensional position specifications to be derived from an interface calculated using a level set method. The use of level set methods for calculating interfaces is known per se, for example from K. Kolev, T. Brox, D. Cremers: Fast Joint Estimation of Silhouettes and Dense 3D Geometry from Multiple Images, IEEE Transactions on Pattern Analysis and Machine Intelligence, 34(3): 493-505, 2012. The level set methods, which are also referred to as Niveaumengenmethoden in German and which can advantageously be used in this case, can be characterized in that, for example, an interface is determined, the points of which have a corresponding or at least sufficiently similar appearance in a three-dimensional space in all images of the sequence, taking into account the respective applicable, previously calculated recording pose. The boundary therefore describes, at least approximately, part of a surface of a recorded scene detected by the image-recording device. By way of example, the further three-dimensional position specifications can now be derived from the interface by virtue of a location of the interface in space and a location of objects on the interface being established.

In one embodiment of the invention, provision can be made for the at least one group of mutually corresponding image constituents to be identified by means of a feature analysis. What is advantageous in this case is that characteristic image constituents, for which corresponding image constituents in the remaining images can easily be found by calculation, are identifiable and identified. The feature analysis can, for example, use corner, edge or any other feature detection, for example by means of SIFT (scale invariant feature transform).

In one embodiment of the invention, provision can be made for the recorded images to be segmented by the image-processing device. What is advantageous in this case is that the image segments can be processed separately from one another. By way of example, it is possible to form image segments which each only contain one image constituent from one group.

In one embodiment of the invention, provision can be made for the distance information in relation to a scene constituent, which corresponds to the at least one group of mutually corresponding image constituents, to be measured automatically. What is advantageous in this case is that a three-dimensional position specification calculated for the at least one group can be related particularly accurately with actually measured distance information.

In one embodiment of the invention, provision can be made for distance information associated with the at least one group of mutually corresponding image constituents to be calculated in an extrapolation or interpolation method from the at least one item of measured distance information and the at least one three-dimensional position specification. What is advantageous in this case is that further distance information is obtainable without additional measurements. Hence, the quality of the calculated 3D image can be improved once again.

Alternatively or additionally, further distance information can be calculated in an extrapolation method and/or interpolation method from already established three-dimensional position specifications. What is advantageous in this case is that additional interpolation nodes are calculable and providable for a 3D image.

In one embodiment of the invention, provision can be made for the scaling to be calculated from the distance information associated with the at least one group of mutually corresponding image constituents. Preferably, this distance information is calculated by an extrapolation or interpolation method. What is advantageous in this case is that the accuracy of the scaling can be increased, without a targeted measurement of distance information being required. The distance information can also be measured directly.

In one embodiment of the invention, provision can be made for the distance information to be measured by a measurement beam, which lies in a spectral range in which the spectral range the image-recording device records. What is advantageous in this case is that a calibration can be undertaken. To this end, a point of incidence of the measurement beam on a scene object—e.g. a light pattern—can be used as prominent image constituent to identify a group of corresponding image constituents. Hence, the aforementioned equations can be used to calculate the way in which the rangefinder is aligned in relation to the image-processing device. The accuracy of the calculation of three-dimensional position specifications can be increased once again using this result of the calibration.

In one embodiment of the invention, provision can be made for a movement of the image-recording device between two individual recordings to be calculated using an output signal of a movement and/or acceleration sensor. What is advantageous in this case is that the calculation of three-dimensional position specifications can be simplified once again since additional information about a change in a recording pose between two individual recordings is available.

In one embodiment of the invention, provision can be made for the at least one three-dimensional position specification to be calculated by means of a SLAM (simultaneous localization and mapping) method. Additionally or alternatively, provision can be made for the at least one three-dimensional position specification to be calculated by means of a structure-from-motion method. What is advantageous in this case is that algorithms which are known per se can be used to implement method steps.

In one embodiment of the invention, provision can be made for a three-dimensional representation of the at least one group of mutually corresponding image constituents to be calculated at the at least one scaled three-dimensional position specification. What is advantageous in this case is that a 3D image or a 3D model of a recorded scene is generable, at least in an approximate manner.

In one embodiment of the invention, provision can be made for a spatial region, in which further three-dimensional position specifications are to be calculated, to be identified and the rangefinder to be actuated in such a way that distance information for the spatial region is measured. What is advantageous in this case is that further three-dimensional position specifications are obtainable in a targeted manner. Hence, a calculated 3D image can be improved in a targeted manner.

In this case, provision can be made for a current recording pose to be calculated or estimated from previously calculated recording poses for the purposes of actuating the rangefinder. By way of example, this can be brought about by a temporal extrapolation of a sequence of recording poses and/or by evaluating an output signal of a movement and/or acceleration sensor. What is advantageous in this case is that a current recording pose is providable as a reference value, at least in an approximate manner.

In one embodiment of the invention, provision can be made for a geometric object to be fit into the at least one three-dimensional position specification. What is advantageous in this case is that relatively complex objects are imagable with simple computational means. An actual form of a recorded scene can therefore be reproduced with little computational outlay.

In one embodiment of the invention, provision can be made for a RANSAC (random sample consensus) method to be carried out for calculating the at least one three-dimensional position specification. What is advantageous in this case is that a method that is implementable with little computational outlay and that supplies usable results is provided.

In one embodiment of the invention, provision can be made for at least one length, area and/or volume to be calculated from the preferably scaled three-dimensional position specifications. Hence, obtained measurement variables can be related to real size relationships.

In one embodiment of the invention, provision can be made for the at least one group to be output at an image point corresponding to the at least one three-dimensional position specification by means of an output unit. What is advantageous in this case is that two-dimensional images of a three-dimensional representation are generable and outputable and are generated and output. By way of example, the output can be brought about by displaying or a printout, storing a digital representation or in any other way.

According to the invention, what is provided in a method for setting up a 3D recording device in order to achieve the object specified above is: that a rangefinder is connected to an image-recording device, that a sequence of at least one image of a scene is recorded, that at least one item of distance information is measured for each image, that an image position in the associated image is determined for each item of measured distance information, to which image position this distance information relates, and that at least one parameter is calculated from the measured distance information and the determined image positions, which parameter describes an alignment of the rangefinder relative to the image-recording device. The required number of recorded images in the sequence depends on the number of parameters to be calculated for aligning the rangefinder relative to the image-recording device. The more degrees of freedom the alignment has, the more images and associated distance measurements are required for setting the parameters. In the most expedient case, one image with one item of distance information can already be sufficient for setting one remaining degree of freedom of the alignment. In the case of a sufficiently large number of recorded images and items of distance information, parameters which describe an imaging property of the image-recording device, for example focal distance, distortion, nodal point and further parameters of a lens system, are also calculable and are calculated using equations known per se. Therefore, parameters are providable or settable, by means of which the described method for setting up a 3D image can be carried out. What is advantageous in this case is that an available image-recording device, for example a smartphone, tablet PC or the like, is easily upgradeable. The image-recording device can be configured to carry out the method according to the invention for producing a 3D image by installing suitably programmed software, for example an app. In this case, the number of recorded images in the sequence will expediently depend on how many parameters of the alignment of the rangefinder relative to the image-recording device are already known or can be assumed as given within the scope of the required accuracy. The more parameters of the alignment are known, i.e. the fewer degrees of freedom of the alignment remain, the fewer number of recordings of images in the sequence are required.

In the case of a sufficiently large number of recorded images in the sequence, it is also possible, in this manner, to calculate parameters which characterize an imaging property of the image-recording device. By way of example, these can be the focal length, the nodal point, the distortion or further parameters of the image-recording device.

In one embodiment of the invention, provision can be made for the known and/or artificially generated scene to be projected with a measurement beam of the rangefinder. Hence, a new calibration can easily be carried out each time there is a connection to the rangefinder if the alignment of the rangefinder is unknown.

BRIEF DESCRIPTION OF THE DRAWINGS

The invention will now be explained in more detail on the basis of exemplary embodiments; however, it is not restricted to these exemplary embodiments. Further exemplary embodiments emerge by combining the features of individual claims or a plurality of claims amongst themselves and/or with individual claims or a plurality of features of the exemplary embodiments.

In detail.

DETAILED DESCRIPTION OF THE PREFERRED EMBODIMENTS

Figure 1:
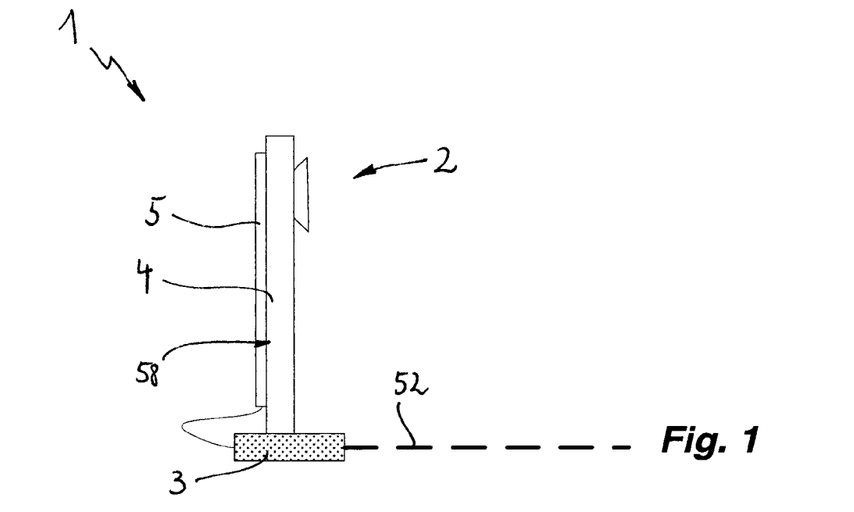
FIG. 1 shows a very much simplified illustration of a 3D recording device according to the invention for explaining the invention.

FIG. 1 shows a 3D recording device according to the invention in a much simplified schematic diagram.

In FIG. 1, the 3D recording device 1 is shown as an upgraded smartphone.

The 3D recording device 1 has an image-recording device 2 and a rangefinder 3. The rangefinder 3 is equipped to measure a distance along a measurement direction. In the exemplary embodiment, the rangefinder 3 is embodied as a laser rangefinder.

In the exemplary embodiment, the image-recording device 2 is a digital camera of the shown smartphone.

The rangefinder 3 is plugged onto the smartphone in order to form the 3D recording device 1 and it is connected for data and/or signal interchange.

An image-processing device 4 is embodied in the interior of the 3D recording device 1.

Furthermore, an output unit 5 in the form of a display is formed on the 3D recording device 1.

Figure 2:
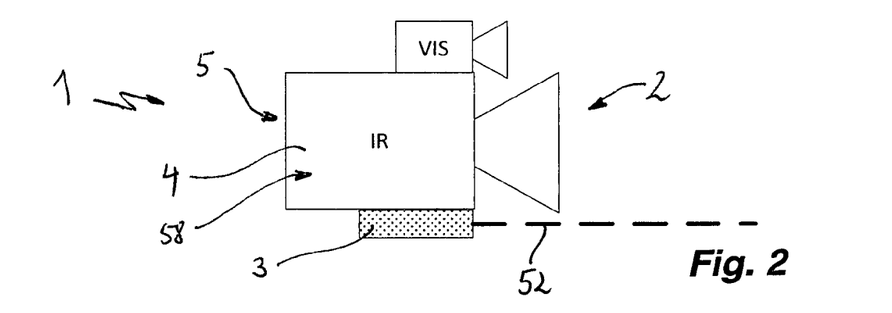
FIG. 2 shows a very much simplified illustration of a further 3D recording device according to the invention.
Figure 3:
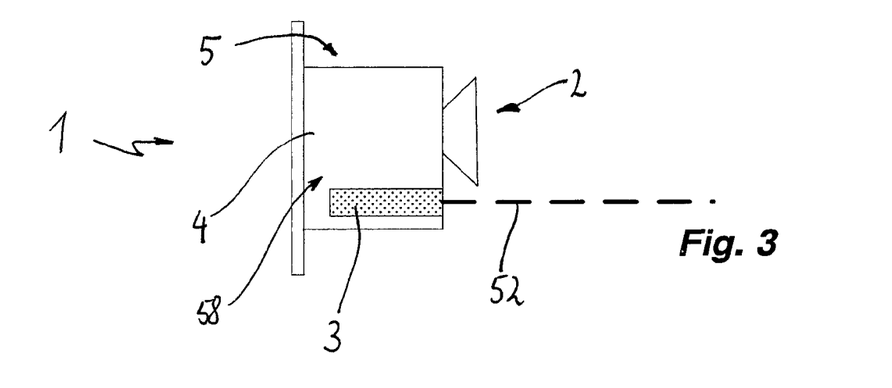
FIG. 3 shows a very much simplified illustration of a further 3D recording device according to the invention.

FIG. 2 and FIG. 3 each show a very much simplified schematic diagram of a further 3D recording device 1 according to the invention for the purposes of explaining the invention. Components and functional units that are the same or similar in terms of function and/or structure to the exemplary embodiment in accordance with FIG. 1 are denoted by the same reference sign and will not be explained separately again. The explanations in relation to FIG. 1 therefore respectively apply accordingly to FIG. 2 and FIG. 3.

The exemplary embodiment in accordance with FIG. 2 differs from the exemplary embodiment in accordance with FIG. 1 in that the image-recording device 2 is embodied as a thermal imaging camera. Therefore, the image-recording device 2 is able to detect light rays in an infrared spectral range in order to produce a thermal image and/or in order to measure a temperature distribution in a contactless manner.

Additionally, the 3D recording device 1 in FIG. 2 still has a VIS (visible) camera 6 in order to record images in the visible spectral range in a manner known per se.

The exemplary embodiment in accordance with FIG. 3 differs from the exemplary embodiment in accordance with FIG. 1 in that the image-recording device 2, the rangefinder 3, the image-processing device 4 and the output unit 5 are embodied in a manner integrated into one instrument. The output unit 5 can also be dispensed with or embodied as a data interface.

The image-processing devices 4 of the illustrated exemplary embodiments are configured to carry out the method according to the invention, which is described below on the basis of FIGS. 4 to 7, by way of programming and electronic circuits.

Figure 5:
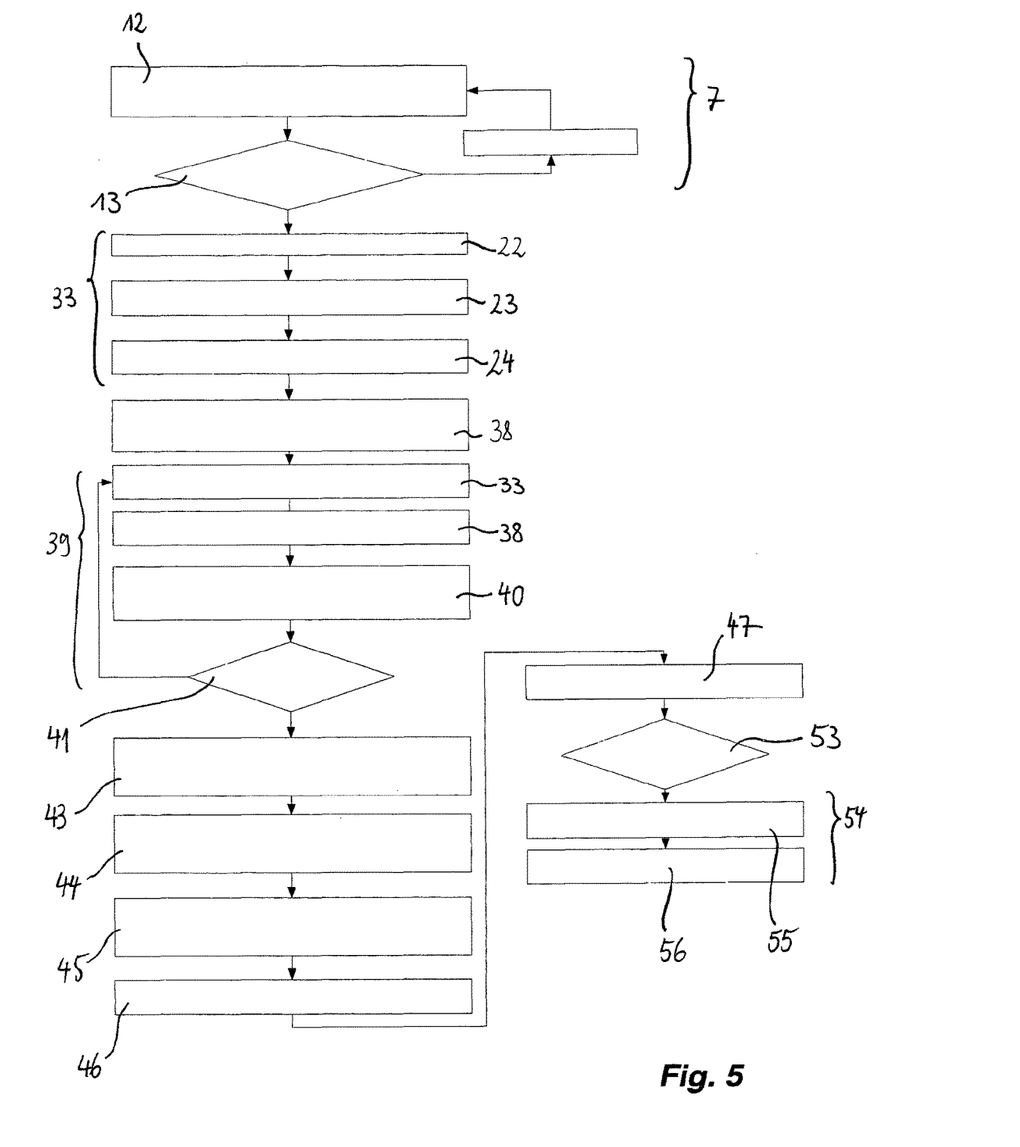
FIG. 5 shows a flowchart which is worked through in the exemplary embodiments of the invention in accordance with FIGS. 1 to 3.

Initially, a sequence 8 of images 9, 10 of a scene 11 is recorded in an image recording step 7.

Here, the image-recording device 2 is configured to record 12 the images 9, 10.

After each recording 12, there is a query 13 as to whether further recordings 12 should be performed.

If this is the case, a change 14 in the recording pose, i.e. the position and orientation, of the image-recording device 2 is initially carried out.

Figure 4:
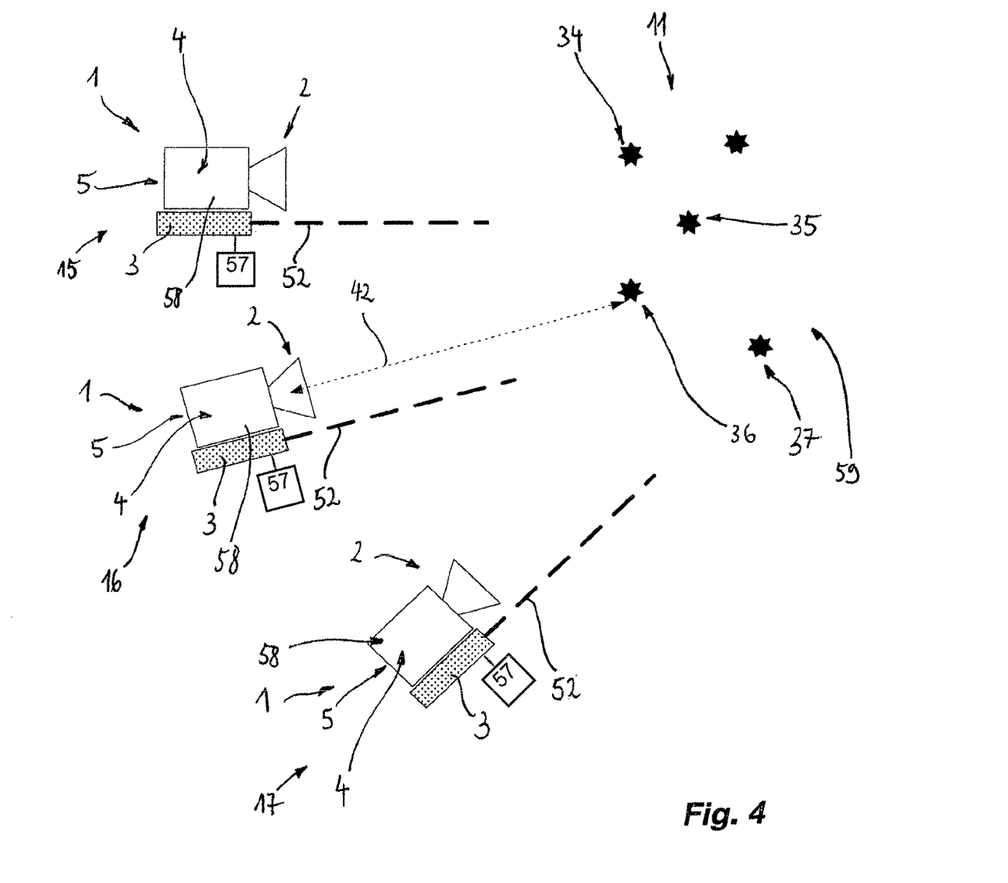
FIG. 4 shows a very much simplified illustration of the recording of images of a scene in order to explain the method according to the invention.

By way of example, the image-recording device 2 is hereby transferred from the recording pose 15 to the recording position 16.

Subsequently, a new recording 12 is carried out.

By way of example, the image-recording device 2 therefore records the image 9 in the recording pose 15 and the image 10 in the recording pose 16. What emerges is the sequence 8 of images 9, 10 depicted in FIG. 7.

Figure 7:
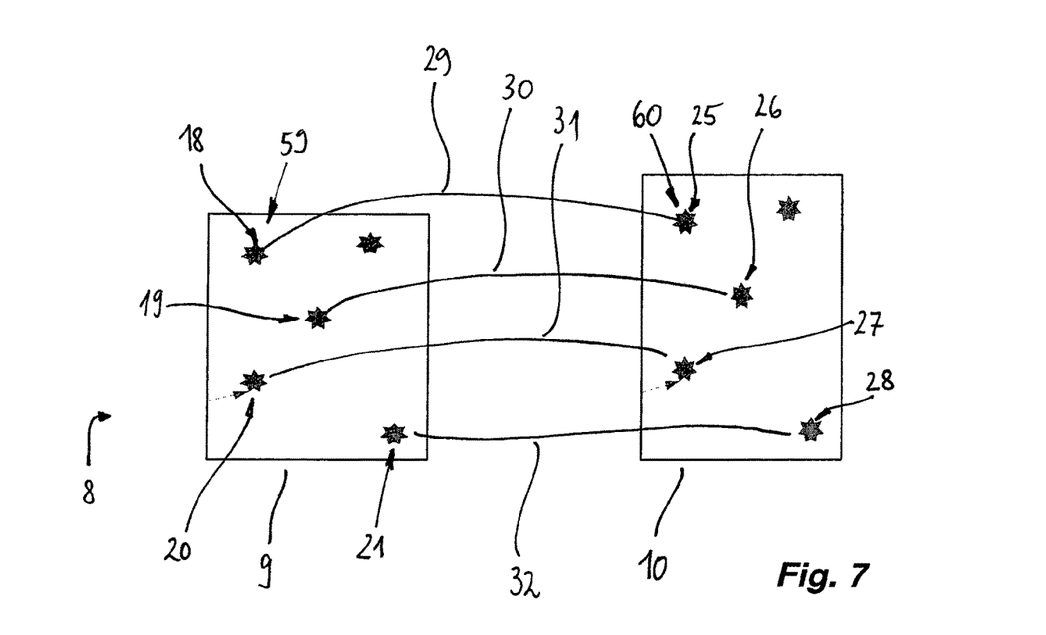
FIG. 7 shows a sequence of images recorded in the method according to the invention.

In the example, at least three images 9, 10 are intended to be recorded to form a sequence 8. In actual fact, a multiplicity of images 9, 10 are recorded, for example as frames of a video sequence.

If there is a negative response to the query 13, the generation of the sequence 8 is completed.

Now, prominent image constituents 18, 19, 20, 21 are identified in a first image 9 of the sequence 8 in an identification step 22. This can be carried out by edge and/or corner detection, contrast detection or in any other way.

A description of the image constituents 18, 19, 20, 21 by features is calculated in a feature analysis 23.

In a correspondence determination step 24, the image-processing device 4 is used to search for image constituents 25, 26, 27, 28 in the second image 10 of the sequence 8 which correspond to the image constituents 18, 19, 20, 21 on the basis of the calculated description. To this end, it is possible to use e.g. correlation methods and/or SLAM and/or structure-from-motion methods known per se.

The mutually corresponding image constituents 18 and 25 as well as 19 and 26 as well as 20 and 27 as well as 21 and 28 therefore in each case form a group 29, 30, 31, 32 of respectively two image constituents 18, 19, 20, 21, 25, 26, 27, 28 corresponding to one another in a pairwise manner.

The image-processing device 4 is therefore configured for the automatic identification 33 of at least one group—four groups 29, 30, 31 and 32 in an exemplary manner in this case—of mutually corresponding image constituents 18, 19, 20, 21, 25, 26, 27, 28.

The groups 29, 30, 31, 32 therefore respectively contain those image constituents 18, 19, 20, 21, 25, 26, 27 and 28 which originate from a common scene constituent 34, 35, 36, 37: thus, the image constituents 18 and 25 in the example are recorded from the scene constituent 34, the image constituents 19 and 26 are recorded from the scene constituent 35, the image constituents 20 and 27 are recorded from the scene constituent 36 and the image constituents 21 and 28 are recorded from the scene constituent 37. In actual fact, a much larger number of image constituents 18, 19, 20, 21, 25, 26, 27, 28 are processed.

The image-processing device 4 is configured for the subsequent calculation 38 of a three-dimensional position specification 50 for each group 29, 30, 31, 32.

To this end, a system of equations is automatically generated and solved in the image-processing device 4, which may have a separate computer unit (not shown in any more detail) to this end, which system of equations describes the image positions 59, 60 of the image constituents 18, 19, 20, 21, 25, 26, 27, 28 in the images 9, 10 as projections of the scene constituents 34, 35, 36, 37 during the respective recording 12. The image positions 59, 60 of the image constituents 18, 19, 20, 21, 25, 26, 27, 28 in the images 9, 10 are included in this system of equations as input variables.

As a result, the calculated three-dimensional position specifications 50 correspond, up to a scale factor, to the spatial position of the scene constituent 34, 35, 36, 37, which the group 29, 30, 31 or 32 respectively represents.

The associated recording pose 15, 16 at the time of the recording 12 of the image 9 or 10 is also calculated from the solution of the aforementioned system of equations.

By way of example, a RANSAC method can be used for the calculation 38.

This is followed by a loop 39, in which the above-described identification 33 and calculation 38 are carried out for further images of the sequence 8, which belong to further recording poses 17.

The calculated recording poses 15, 16, 17 and three-dimensional position specifications 50 are refined with the newly calculated data in a best-fit calculation 40.

The loop 39 is aborted when a query 41 reveals that the sequence 8 has no further images 9, 10 that need to be processed.

Distance information 42 is measured in each case by the rangefinder 3 during the recordings 12.

What FIG. 4 depicts is that the distance information 42 recorded in the recording pose 16 represents the distance between the image-recording device 2 and the scene constituent 36 at the time of the recording 12 of the image 10.

By contrast, the measurements in the recording poses 15 and 17 do not relate to any scene constituent 34, 35, 36 or 37, but rather come to nothing.

For reasons of simplicity, only one item of distance information 42 is shown, even though at least one item of distance information 42 is respectively measured for each recording pose 15, 16, 17.

The alignment of the rangefinder 3 in relation to the recording pose 15, 16, 17 is known in each case. It can be unchanging—as shown here—or the rangefinder 3 can have a movable embodiment in relation to the image-recording device 2. A non-movable rangefinder 3 can also be configured to change the measurement beam 52—for example by means of optics or by means of mirrors.

3D spatial points, in relation to which the distance information 42 was measured, are respectively calculated in a beam calculation step 43 from the previously calculated recording poses 15, 16, 17 and the measured distance information 42.

Those items of distance information 42 which lie sufficiently closely to a three-dimensional position specification of a group 29, 30, 31, 32 and thus describe the distance to the associated scene constituent 34, 35, 36, 37 sufficiently exactly are selected in a selection step 44. In other words, outliers are eliminated in this step.

These items of selected distance information 42 can therefore be used as a reference scale. An ideal scale factor is calculated in a scale calculation step 45. By way of example, this can be brought about on the basis of all meaningful correlations between items of distance information 42 and calculated three-dimensional position specifications 50.

Subsequently, the calculated three-dimensional position specifications 50 are scaled in a scaling 46 such that these correspond to the actual dimensions and positions of the scene constituents 34, 35, 36, 37.

Further items of distance information are calculated in an extrapolation and/or interpolation method 47 for three-dimensional position specifications which cannot be assigned to measured items of distance information 42.

In the extrapolation and/or interpolation method 47, three-dimensional position specifications 48, 49 are calculated for the previously eliminated items of distance information 42.

Figure 6:
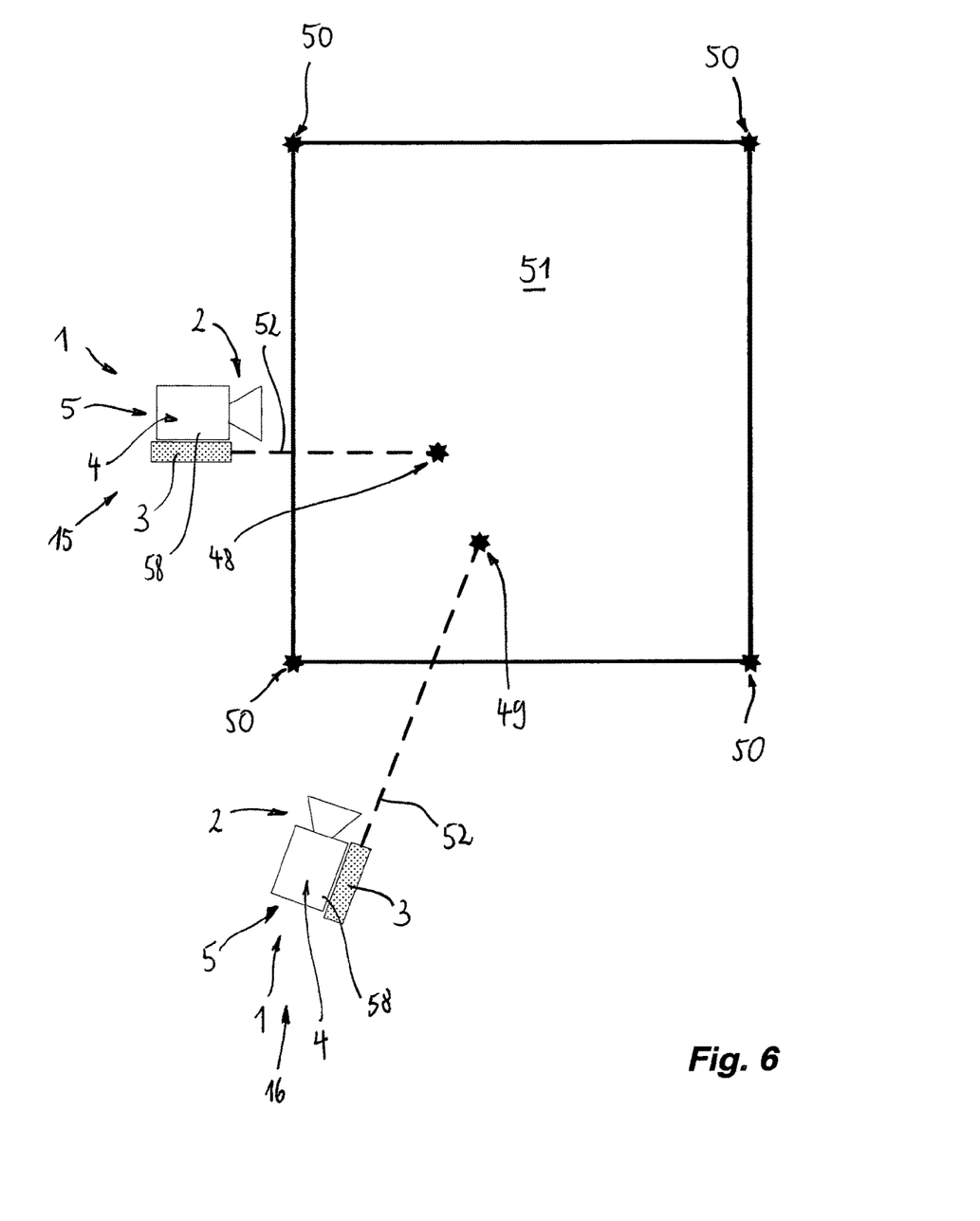
FIG. 6 shows a much simplified schematic diagram of the interpolation of items of distance information in one exemplary embodiment of the invention.

This is shown in FIG. 6: to this end, a geometric object 51 (in this case a plane) is fitted by means of an optimization into the three-dimensional position specifications 50 calculated previously in relation to the groups 29, 30, 31, 32.

The calculated further three-dimensional position specifications 48 and 49 emerge as points of intersection between a measurement beam 52 of the rangefinder 3 and the geometric object 51.

These calculated further three-dimensional position specifications 48, 49 are used as additional interpolation nodes for producing a three-dimensional representation of the groups 29, 30, 31, 32 at their respective three-dimensional position specifications 50 in a 3D image.

Graphic illustrations from this 3D image can be output at the output unit 5, in which graphic illustrations the groups 29, 30, 31, 32 are displayed at an image point which is given by the associated three-dimensional position specification 48, 49, 50.

Further processing 54 of the computation results can be initiated at a query 53.

Segmentation 55 of areas or other image segments in the images 9, 10 can be carried out during this processing 54.

The rangefinder 3 can be aligned by way of an actuation unit (schematically represented by actuator 57) to scene constituents 34, 35, 36, 37 of the scene 11 which belong to the segmented areas. To this end, the rangefinder 3 is arranged in a movable manner on the 3D recording device 1.

Now it is possible to measure further items of distance information 42 in relation to the new alignments.

Planes or other geometric objects 51 are calculated in an object calculation step 56 in relation to the segmented areas or other image segments on the one hand and the three-dimensional position specifications 48, 49, 50 on the other hand.

By way of the scaling 46, it is possible to calculate an actual extent or dimension, e.g. an actual length or an actual area or volume, for the geometric objects 51.

If the alignment of the rangefinder 3 relative to the image-recording device 2 is unknown, a light pattern of the measurement beam 52 on a plane surface of a scene 11 can be used as described instead of the scene constituents 34, 35, 36, 37 in a calibration. The unknown alignment can be calculated from the image positions of this light pattern in the images 9, 10.

To this end, a measurement beam 52 is generable by the rangefinder 3 in a spectral range in which the image-recording device 2 is sensitive so as to detect the light pattern.

Alternatively, it is also possible to record a known scene 11 with a known geometry.

The 3D recording device 1 has a movement and/or acceleration sensor 58, known per se, by means of which a change in the recording pose 15, 16, 17 between two recordings 12 can be detected. The output signal of said sensor is included in the calculation of the recording poses 15, 16, 17.

If the image-processing device 4 and/or the user determine that additional three-dimensional position specifications 48, 49 are required in a spatial region, it is possible to proceed according to the following method.

The assumption is made that, in FIG. 4, a first recording 12 was carried out in the recording pose 15 and a second recording 12 was carried out in a recording pose 16. The three-dimensional position specifications 50 of the scene constituents 34, 35, 36, 37 emerge as described above from the processing of the images 9, 10.

Suppose that the user or a program running in the image-processing device comes to the conclusion that there still are too few three-dimensional position specifications 50 in a spatial region 59.

The recording poses 15, 16 of the images 9, 10 were already calculated from solving the already mentioned system of equations.

From this, it is possible to calculate by extrapolation the recording pose 17 in which the image-recording device 2 is currently situated.

Alternatively or additionally, the recording pose 17 can be established from the output signals of the movement and/or acceleration sensor 58—possibly by suitable integration.

When the recording pose 17 is known, the measurement beam 52 of the rangefinder 3 is now aligned in such a way that distance information to the spatial region 59 and/or to a scene constituent 37 situated therein is measurable. This is carried out by means such as mirrors or the like which are known per se for beam deflection.

Subsequently, the further three-dimensional position specification required is calculated for this distance information.

FIG. 1 shows a 3D recording device 1 according to the invention with a removable rangefinder 3. What emerges as a result of the removable property is that the exact alignment of the measurement beam 52 in relation to a recording direction of the image-recording device 2 is unknown.

The information about this alignment can be obtained in a simple manner during a calibration.

To this end, the rangefinder 3 is used to project a light pattern—a single light point in the simplest case—onto a scene 11, e.g. a plane surface. What emerges thus is the situation in FIG. 4, wherein the scene constituents 34, 35, 36, 37 are given by constituents of the light pattern. In the case of a single light point, only one scene constituent 34 occurs in this case.

By way of example, the light pattern is produced from the measurement of the distance information 42 using a laser rangefinder or it is projected independently of the measurement of the distance information 42.

In the images 9, 10, this light pattern is recorded from different recording poses 15, 16, 17. Three-dimensional position specifications 50 are calculated for the image constituents 18, 19, 20, 21 and 25, 26, 27, 28 in a manner as described above. Furthermore, the recording poses 15, 16, 17 are calculated.

Since the geometry of the light pattern is known, that alignment of the rangefinder 3, or of the measurement beam 52 relative to the image-recording device 2, for which the light pattern corresponds to the calculated three-dimensional position specifications 50 can be calculated therefrom.

In the case of a distance measurement without visible light, the calibration can be carried out with the aid of a known scene 11, for example a printed pattern.

This information about the alignment is now stored and provided for subsequent processing of images 9, 10 in an unknown scene 11.

This calibration can be carried out anew each time the rangefinder 3 is connected to the image-recording device 2.

What is provided in the case of a 3D recording device 1 with an image-recording device 2, a rangefinder 3 and an output unit 5 is that an image-processing device 4 is used to calculate groups 29, 30, 31, 32 of mutually corresponding image constituents 18, 19, 20, 21, 25, 26, 27, 28 in a sequence 8 of images 9, 10 recorded in different recording poses 15, 16, 17 and to establish respectively one three-dimensional position specification 48, 49, 50 for these groups 29, 30, 31, 32 and to scale the three-dimensional position specification 48, 49, 50 with distance information 42 measured by the rangefinder 3 (FIG. 4).

The invention claimed is:

1. A 3D recording device (1) comprising: an image-recording device (2), a rangefinder (3) and an image-processing device (4), the image-processing device (4) is configured to: identify (33) at least one group (29, 30, 31, 32) of mutually corresponding image constituents (18, 19, 20, 21, 25, 26, 27, 28) in a sequence (8) of at least two images (9, 10) recorded by the image-recording device (2), calculate (38) at least one three-dimensional position specification (50) in relation to the at least one group (29, 30, 31, 32) of the mutually corresponding image constituents (18, 19, 20, 21, 25, 26, 27, 28) from a respective image position (59, 60) of the image constituents (18, 19, 20, 21, 25, 26, 27, 28) from the group (29, 30, 31, 32) in the images (9, 10) of the sequence (8), calculate (38) a recording pose of the image-recording device (2) from the respective image position (59, 60) of each of the image constituents (18, 19, 20, 21, 25, 26, 27, 28) of the at least one group (29, 30, 31, 32), and then scale (46) a calculated at least one three-dimensional position specification (50) using measured distance information (42) that is measured by the rangefinder (3); and calculate further three-dimensional distance information associated with the at least one group (29, 30, 31, 32) of mutually corresponding image constituents (18, 19, 20, 21, 25, 26, 27, 28) for which no distance measurement is available, in at least one of an extrapolation or interpolation method (47) from the measured distance information (42) and the calculated at least one three-dimensional position specification (50).

2. The 3D recording device (1) as claimed in claim 1, further comprising an output unit (5) configured to output the at least one three-dimensional position specification which is scaled.

3. The 3D recording device (1) as claimed in claim 1, wherein the image-processing device is configured to calculate further three-dimensional position specifications (48, 49) from the calculated three-dimensional position specifications (50) and recording poses (15, 16, 17).

4. The 3D recording device (1) as claimed in claim 1, wherein the image-processing device (4) is configured to identify (33) the at least one group (29, 30, 31, 32) of mutually corresponding image constituents (18, 19, 20, 21, 25, 26, 27, 28) using a feature analysis (23), or the image-processing device (4) is configured to segment (55) the images (9, 10) into image segments, or the image-processing device (4) is configured to identify (33) the at least one group (29, 30, 31, 32) of mutually corresponding image constituents (18, 19, 20, 21, 25, 26, 27, 28) using a feature analysis (23) and to segment (55) the images (9, 10) into image segments.

5. The 3D recording device (1) as claimed in claim 1, wherein an actuator (57) is embodied to align a measurement direction of the rangefinder (3) in such a way that the measured distance information (42) is related to an image segment.

6. The 3D recording device (1) as claimed in claim 1, wherein at least one of a movement or acceleration sensor (58) is configured to detect a movement of the image-recording device (2).

7. The 3D recording device (1) as claimed in claim 1, wherein the image-processing device (4) is configured to fit a geometric object (51) into the at least one scaled three-dimensional position specification.

8. The 3D recording device (1) as claimed in claim 1, wherein the image-processing device (4) is configured to calculate at least one of a length, area or volume from the at least one three-dimensional position specification.

9. The 3D recording device (1) as claimed in claim 1, wherein the rangefinder (3) is embodied as a laser rangefinder.

10. The 3D recording device (1) as claimed in claim 1, wherein the image-processing device is configured to calculate further three-dimensional position specifications (48, 49) from the calculated three-dimensional position specifications (50) and recording poses (15, 16, 17) using a stereo method or from an interface calculated by a level set method.

11. The 3D recording device (1) as claimed in claim 1, wherein the rangefinder (3) is configured to modify an alignment of at least one of a measurement direction or a measurement beam (52).

12. The 3D recording device (1) as claimed in claim 1, wherein the rangefinder (3) is embodied to generate a measurement beam (52) in a spectral range detectable by the image-recording device (2).

13. The 3D recording device (1) as claimed in claim 1, wherein the image-processing device (4) is configured to calculate a three-dimensional representation of the at least one group (29, 30, 31, 32) of the mutually corresponding image constituents (18, 19, 20, 21, 25, 26, 27, 28) at the at least one scaled three-dimensional position specification.

14. The 3D recording device (1) as claimed in claim 1, wherein the output unit (5) is configured to graphically output the at least one group (29, 30, 31, 32) of mutually corresponding image constituents (18, 19, 20, 21, 25, 26, 27, 28) at an image point corresponding to the three-dimensional position specification (48, 49, 50).

15. A method for producing a 3D image, comprising recording a sequence (8) of at least two images (9, 10) of a scene (11) using an image-recording device (2) and identifying at least one group (29, 30, 31, 32) of mutually corresponding image constituents (18, 19, 20, 21, 25, 26, 27, 28) in the recorded images (9, 10), calculating at least one three-dimensional position specification (50) relating to the at least one group (29, 30, 31, 32) of mutually corresponding image constituents (18, 19, 20, 21, 25, 26, 27, 28) in an image-processing device (4), calculating at least one recording pose (15, 16, 17) of the image-recording device (2) at a recording time from a respective image position (59, 60) of the image constituents (18, 19, 20, 21, 25, 26, 27, 28) from the at least one group (29, 30, 31, 32) in the images (9, 10) of the sequence (8), measuring at least one item of distance information (42) in relation to the scene (11) using a rangefinder (3), and then scaling (46) the three-dimensional position specification using the measured distance information (42), and calculating further three-dimensional distance information associated with the at least one group (29, 30, 31, 32) of mutually corresponding image constituents (18, 19, 20, 21, 25, 26, 27, 28) for which no distance measurement is available, in at least one of an extrapolation or interpolation method (47) from the measured distance information (42) and the calculated at least one three-dimensional position specification (50).

16. The method as claimed in claim 15, further comprising calculating further three-dimensional position specifications (48, 49) using a stereo method, or deriving the further three-dimensional position specifications (48, 49) from an interface calculated using a level set method.

17. The method as claimed in claim 15, further comprising identifying the at least one group (29, 30, 31, 32) of mutually corresponding image constituents (18, 19, 20, 21, 25, 26, 27, 28) using a feature analysis (23) or segmenting the recorded images (9, 10) using by the image-processing device (4).

18. The method as claimed in claim 15, further comprising measuring the distance information (50) in relation to a scene constituent (34, 35, 36, 37), which corresponds to the at least one group (29, 30, 31, 32) of mutually corresponding image constituents (18, 19, 20, 21, 25, 26, 27, 28), automatically.

19. The method as claimed in claim 15, further comprising calculating the scaling (46) from the distance information (42) associated with the at least one group (29, 30, 31, 32) of mutually corresponding image constituents (18, 19, 20, 21, 25, 26, 27, 28), or measuring distance information (42) in relation to each image segment of the images (9, 10).

20. The method as claimed in claim 15, further comprising measuring the distance information (42) using a measurement beam (52), which lies in a spectral range in which the image-recording device (2) records.

21. The method as claimed in claim 15, further comprising calculating the at least one three-dimensional position specification (48, 49, 50) using at least one of a SLAM method, or structure-from-motion method.

22. The method as claimed in claim 15, further comprising identifying a spatial region (59), in which further three-dimensional position specifications (48, 49) are to be calculated, and actuating the rangefinder (3) in such a way that the distance information (42) for the spatial region (59) is measured or a current recording pose (17) is calculated or estimated from previously calculated recording poses (15, 16) for the purposes of actuating the rangefinder (3).

23. The method as claimed in claim 15, further comprising fitting a geometric object (51) into the at least one three-dimensional position specification (48, 49, 50).

24. The method as claimed in claim 15, further comprising calculating at least one of a length, area or volume from the at least one three-dimensional position specification.

25. A method for setting up a 3D recording device for carrying out the method of claim 15, comprising connecting the rangefinder (3) to the image-recording device (2), measuring the at least one item of distance information (42) for each of the images (9, 10), determining an image position in the associated image (9, 10) for each said item of measured distance information (42), to which image position said distance information (42) relates, and calculating at least one parameter from the measured distance information (42) and the determined image positions, said parameter describing an alignment of the rangefinder (3) relative to the image-recording device (2).

26. The method as claimed in claim 25, further comprising projecting at least one of a known or an artificially generated scene with a measurement beam (52) of the rangefinder (3).

27. The method as claimed in claim 15, further comprising calculating further three-dimensional position specifications (48, 49) in relation to further image constituents before or after the scaling.

28. The method as claimed in claim 15, further comprising calculating a movement of the image-recording device (2) between two individual recordings using an output signal of at least one of a movement or acceleration sensor (58).

29. The method as claimed in claim 15, further comprising calculating a three-dimensional representation of the at least one group (29, 30, 31, 32) of mutually corresponding image constituents (18, 19, 20, 21, 25, 26, 27, 28) at the at least one scaled three-dimensional position specification.

30. The method as claimed in claim 15, further comprising outputting the at least one group (29, 30, 31, 32) at an image point corresponding to the at least one three-dimensional position specification (48, 49, 50) using an output unit (5).

* * * * *